United States Patent
Hankins et al.

(10) Patent No.: US 12,434,101 B2
(45) Date of Patent: Oct. 7, 2025

(54) BASEBALL PITCH TAGGING FOR BALL TRACKING DEVICES

(71) Applicants: John Andrew Hankins, Carlsbad, CA (US); Craig Anthony Filicetti, Scottsdale, AZ (US)

(72) Inventors: John Andrew Hankins, Carlsbad, CA (US); Craig Anthony Filicetti, Scottsdale, AZ (US)

(*) Notice: Subject to any disclaimer, the term of this patent is extended or adjusted under 35 U.S.C. 154(b) by 0 days.

(21) Appl. No.: 18/982,249

(22) Filed: Dec. 16, 2024

(65) Prior Publication Data

US 2025/0222306 A1      Jul. 10, 2025

Related U.S. Application Data

(63) Continuation of application No. 18/808,416, filed on Aug. 19, 2024, which is a continuation of application No. 18/606,378, filed on Mar. 15, 2024, now Pat. No. 12,102,874, which is a continuation of application No. 18/407,610, filed on Jan. 9, 2024, now abandoned.

(51) Int. Cl.
*A63B 24/00* (2006.01)

(52) U.S. Cl.
CPC .. *A63B 24/0021* (2013.01); *A63B 2024/0034* (2013.01)

(58) Field of Classification Search
CPC .................. A63B 24/0021; A63B 2024/0034
See application file for complete search history.

(56) References Cited

U.S. PATENT DOCUMENTS

| 4,203,595 A | 5/1980 | Thompson |
| 4,536,739 A | 8/1985 | Nobuta |

(Continued)

FOREIGN PATENT DOCUMENTS

| JP | S6030223 A | 2/1985 |
| JP | 2003198457 A | 7/2003 |

(Continued)

OTHER PUBLICATIONS

Https://armillatech.com/.

(Continued)

*Primary Examiner* — Reginald A Renwick
(74) *Attorney, Agent, or Firm* — NovoTechIP International PLLC

(57) ABSTRACT

A ball flight management system includes a receiver configured to receive a wireless signal comprising an indication of an intended pitch type selected from among a plurality of intended pitch types, one or more sensors configured to measure one or more ball flight parameters of a pitched ball and output one or more measured ball flight parameters, and a recording unit in communication with the one or more sensors and the receiver, the recording unit receiving and storing the one or more measured ball flight parameters output by the one or more sensors and the indication of the intended pitch type received by the receiver, the recording unit associating the intended pitch type with the at least one measured ball flight parameter to generate a record for the pitched ball that includes the at least one measured ball flight parameter and the intended pitch type, and storing the record.

21 Claims, 11 Drawing Sheets

(56) References Cited

U.S. PATENT DOCUMENTS

| | | | |
|---|---|---|---|
| 5,461,371 A | 10/1995 | Matsumoto et al. | |
| 5,984,810 A | 11/1999 | Frye et al. | |
| 6,285,757 B1 | 9/2001 | Carroll et al. | |
| 6,301,367 B1 | 10/2001 | Boyden et al. | |
| 6,652,284 B2 | 11/2003 | August et al. | |
| 6,728,518 B1 | 4/2004 | Scrivens et al. | |
| 7,110,552 B1 | 9/2006 | Saliterman | |
| 8,126,143 B2 | 2/2012 | Daniel et al. | |
| 8,156,571 B2 | 4/2012 | Barzilla | |
| 8,201,274 B2 | 6/2012 | Ellis | |
| 8,279,051 B2 | 10/2012 | Khan | |
| 8,666,075 B2 | 3/2014 | Daniel et al. | |
| 8,793,321 B2 | 7/2014 | Williams | |
| 8,964,980 B2 | 2/2015 | Daniel | |
| 9,071,901 B2 | 6/2015 | Black | |
| 9,129,541 B2 | 9/2015 | Weiler et al. | |
| 9,485,573 B2 | 11/2016 | Black | |
| 9,757,068 B2 | 9/2017 | Cantrell | |
| 10,080,950 B2 | 9/2018 | Kelley | |
| 10,532,266 B2 | 1/2020 | Genova | |
| 10,951,747 B2 | 3/2021 | Black | |
| 11,266,897 B1 | 3/2022 | Charalambides et al. | |
| 2001/0002928 A1 | 6/2001 | Cummins | |
| 2002/0132211 A1 | 9/2002 | August et al. | |
| 2005/0049080 A1 | 3/2005 | Hovington | |
| 2005/0170870 A1 | 8/2005 | Goldenberg et al. | |
| 2005/0212202 A1 | 9/2005 | Meyer | |
| 2005/0228866 A1 | 10/2005 | Endler et al. | |
| 2006/0025206 A1 | 2/2006 | Walker et al. | |
| 2007/0290801 A1 | 12/2007 | Powell | |
| 2008/0153557 A1 | 6/2008 | Matveev | |
| 2008/0206723 A1 | 8/2008 | Hunter | |
| 2008/0268913 A1 | 10/2008 | Heikkinen | |
| 2010/0077536 A1 | 4/2010 | Daniel et al. | |
| 2010/0080390 A1 | 4/2010 | Daniel | |
| 2010/0091995 A1 | 4/2010 | Chen | |
| 2011/0190048 A1 | 8/2011 | Walthour | |
| 2011/0246579 A1 | 10/2011 | Williams | |
| 2012/0122069 A1 | 5/2012 | Coleman | |
| 2012/0242669 A1 | 9/2012 | Weiler et al. | |
| 2013/0052943 A1 | 2/2013 | Black | |
| 2014/0064511 A1 | 3/2014 | Desai | |
| 2014/0119554 A1 | 5/2014 | Chan | |
| 2014/0277636 A1* | 9/2014 | Thurman | A63B 69/0002 700/91 |
| 2014/0288683 A1 | 9/2014 | Sullivan | |
| 2016/0158639 A1 | 6/2016 | Cantrell | |
| 2016/0322078 A1 | 11/2016 | Bose | |
| 2017/0065872 A1 | 3/2017 | Kelley | |
| 2017/0070797 A1 | 3/2017 | Spector | |
| 2017/0144024 A1 | 5/2017 | Warners et al. | |
| 2017/0372564 A1 | 12/2017 | Amelio et al. | |
| 2018/0043229 A1 | 2/2018 | Stemle | |
| 2018/0234190 A1 | 8/2018 | Rauhala | |
| 2018/0294893 A1 | 10/2018 | Pedersen et al. | |
| 2019/0258452 A1 | 8/2019 | Yamada | |
| 2019/0391254 A1 | 12/2019 | Asghar | |
| 2020/0188761 A1 | 6/2020 | Williams | |
| 2021/0141414 A1 | 5/2021 | Verma | |
| 2021/0225141 A1 | 7/2021 | Petrillo | |
| 2022/0276826 A1 | 9/2022 | Hankins et al. | |
| 2023/0009354 A1 | 1/2023 | DeCarlo | |
| 2023/0196770 A1 | 6/2023 | Anton et al. | |
| 2023/0410507 A1 | 12/2023 | Hall | |
| 2024/0220189 A1 | 7/2024 | Hankins et al. | |

FOREIGN PATENT DOCUMENTS

| | | |
|---|---|---|
| JP | 2006229373 A | 8/2006 |
| JP | 2009159447 A | 7/2009 |
| WO | 2012019089 A1 | 2/2012 |
| WO | 2015196246 A1 | 12/2015 |
| WO | 2021113073 A1 | 6/2021 |

OTHER PUBLICATIONS

Https://gamedaysignals.com/.

"Inception" by ProMystic, product release 2018, see https://promystic.com and https://www.penguinmagic.com/p/13973.

\* cited by examiner

| Event | Time | PID | Pitch Type | Velo | Spin | VBrk | HBrk |
|---|---|---|---|---|---|---|---|
| 1 | 18:07:05:22 | 12 | Fastball | 95.2 | 2573 | 2.43 | 1.22 |
| 2 | 18:07:20:08 | 12 | Curveball | 86.3 | 2819 | 6.25 | 8.23 |
| 3 | 18:07:39:47 | 12 | Fastball | 94.9 | 2448 | 1.88 | 1.49 |
| 4 | 18:08:10:12 | 12 | Slider | 90.1 | 2615 | 4.95 | 2.38 |
| 5 | 18:08:25:29 | 12 | Curveball | 85.8 | 2919 | 6.72 | 7.51 |

FIG. 4

| Event | TX Time | Intended Pitch Type | Time Interval |
|---|---|---|---|
| 1 | 00:00:00:00 | Fastball | 00:00:00:00 |
| 2 | 00:00:03:17 | Curveball | 00:00:03:17 |
| 3 | 00:00:05:21 | Fastball | 00:00:02:04 |
| 4 | 00:00:17:38 | Curveball | 00:00:12:17 |
| 5 | 00:00:33:42 | Fastball | 00:00:16:04 |
| 6 | 00:00:58:53 | Fastball | 00:00:25:11 |
| 7 | 00:01:02:04 | Slider | 00:00:03:11 |
| 8 | 00:01:11:19 | Fastball | 00:00:09:15 |
| 9 | 00:01:14:26 | Curveball | 00:00:03:07 |

FIG. 5

| Event | BFMeasuredTime | PID | Velo | Spin | VBrk | HBrk |
|---|---|---|---|---|---|---|
| 1 | 18:07:05:22 | 12 | 95.2 | 2573 | 2.43 | 1.22 |
| 2 | 18:07:20:08 | 12 | 86.3 | 2819 | 6.25 | 8.23 |
| 3 | 18:07:39:47 | 12 | 94.9 | 2448 | 1.88 | 1.49 |
| 4 | 18:08:10:12 | 12 | 90.1 | 2615 | 4.95 | 2.38 |
| 5 | 18:08:25:29 | 12 | 85.8 | 2919 | 6.72 | 7.51 |

FIG. 6

| Event | TX Adjusted Time | Intended Pitch Type |
|---|---|---|
| 1 | 00:00:00:00 | Fastball |
| 2 | 00:00:03:17 | Curveball |
| 3 | 18:07:00:01 | Fastball |
| 4 | 18:07:12:18 | Curveball |
| 5 | 18:07:28:22 | Fastball |
| 6 | 18:07:53:33 | Fastball |
| 7 | 18:07:56:44 | Slider |
| 8 | 18:08:12:59 | Fastball |
| 9 | 18:08:15:06 | Curveball |

FIG. 7

| Event | TX Adjusted Time | Intended Pitch | BF Measured Time |
|---|---|---|---|
| 1 | 00:00:00:00 | Fastball | |
| 2 | 00:00:03:17 | Curveball | |
| 3 | 18:07:00:01 | Fastball | 18:07:05:22 |
| 4 | 18:07:12:18 | Curveball | 18:07:20:08 |
| 5 | 18:07:28:22 | Fastball | 18:07:39:47 |
| 6 | 18:07:53:33 | Fastball | |
| 7 | 18:07:56:44 | Slider | 18:08:10:12 |
| 8 | 18:08:12:59 | Fastball | |
| 9 | 18:08:15:06 | Curveball | 18:08:25:29 |

FIG. 8

| Event | Time | PID | Pitch Type | Velo | Spin | VBrk | HBrk |
|---|---|---|---|---|---|---|---|
| 1 | 18:07:05:22 | 12 | Fastball | 95.2 | 2573 | 2.43 | 1.22 |
| 2 | 18:07:20:08 | 12 | Curveball | 86.3 | 2819 | 6.25 | 8.23 |
| 3 | 18:07:39:47 | 12 | Fastball | 94.9 | 2448 | 1.88 | 1.49 |
| 4 | 18:08:10:12 | 12 | Slider | 90.1 | 2615 | 4.95 | 2.38 |
| 5 | 18:08:25:29 | 12 | Curveball | 85.8 | 2919 | 6.72 | 7.51 |

FIG. 9

BASEBALL PITCH TAGGING FOR BALL TRACKING DEVICES

CROSS-REFERENCE TO RELATED APPLICATIONS

This application is a continuation of U.S. patent application Ser. No. 18,808,416, filed Aug. 19, 2024, which is a continuation of U.S. patent application Ser. No. 18/606,378, filed Mar. 15, 2024, which is a continuation of U.S. patent application Ser. No. 18/407,610, filed Jan. 9, 2024, the contents of which are incorporated herein by reference in their entirety.

TECHNICAL FIELD

The present disclosure relates generally to ball tracking devices.

BACKGROUND

Baseball has been a sport steeped in tradition, with change coming slowly. This included changes to the game on the field and also to player evaluation and development. In recent decades, however, there has been an increased willingness, and even desire, to modernize the sport in many ways. Major League Baseball ("MLB") has been altering the rules recently to allow electronic communication between the catcher and the pitcher, banned shifting of players, added a pitch clock, increased the size of the bases, and even change the alignment of the layout of the bases. These changes have and will alter the way the game has been played for over a hundred years.

Player evaluation and development has also seen a revolution with the advent and application of technology to the sport. For many years, coaches and scouts relied on their eyes to coach and evaluate players. For pitchers, for example, until the introduction of the radar gun, it was very difficult to precisely determine how fast a pitcher was actually throwing. Since the introduction of the radar gun, a number of technological innovations have been introduced that help coaches and scouts in their coaching and evaluation. These include sophisticated tracking devices that can track players, bats, baseballs and more, with increasing precision. However, current approaches to tagging pitch data for analysis is a manual and error prone process. Hence, there is a need for improved systems and methods for tagging pitch information.

SUMMARY

There is a need for a measurement system that provides accurate pitch tagging. These needs are met by a pitch tagging system comprising an intended pitch type communication system that includes a transmitter configured to wirelessly transmit a selectable intended pitch type, and a pitcher receiver configured to wirelessly receive the intended pitch type and signal the pitcher with the intended pitch type. A measuring device having one or more sensors is configured to measure at least one ball flight parameter of a pitched ball. A recording unit is in communication with the measuring device and the receiver that receives the measured ball flight parameter and the wirelessly transmitted intended pitch type and associates the intended pitch type with the at least one measured ball flight parameter to output a record for the pitched ball that includes the at least one measured ball flight parameter and the intended pitch type.

The earlier stated and other technical problems are met by other embodiments of the application which provide a pitch tagging system to tag a recorded series of measured ball flight parameters measured by a ball flight measuring system. The pitch tagging system includes an intended pitch type system that has a transmitter configured to wirelessly provide a pitcher with an intended pitch type, and a pitcher receiver configured to wirelessly receive the intended pitch type and signal the pitcher with the intended pitch type. The pitch tagging system also includes a pitch type recording unit that records the intended pitch types for a series of pitches and outputs a recorded series of intended pitch types for the series of pitches. The system also includes a correlator configured to compare the output recorded series of intended pitch types for the series of pitches with a recorded series of measured ball flight parameters for the series of pitches and associate the intended pitch types in the recorded series of pitches with the recorded series of measured ball flight parameters for the series of pitches such that for individual pitches thrown within the series of pitches the intended pitch type and measured ball flight parameters are associated. The pitch tagging system also includes an output device that receives and outputs the series of pitches with individual pitches having respective associated intended pitch types and measured ball flight parameters for those individual pitches.

Embodiments of the application provide technical solutions to the technical problems discussed herein by providing a pitch tagging system for associating intended pitch types with ball flight parameters measured by a ball flight tracking system equipped with sensors configured to measure ball flight parameters of a thrown ball. The system includes a wireless transmitter configured to transmit intended pitch type data and a receiver wearable by a pitcher. The receiver is compatible with the wireless transmitter to receive the intended pitch type data from the transmitter and signal the intended pitch type data to the pitcher. A processing unit correlates the intended pitch type data transmitted to the receiver with the measured ball flight parameters collected by the ball flight tracking system to characterize individual pitches with a communicated intended pitch type and corresponding measured flight parameters for those individual pitches. The pitch tagging system has a data storage system capable of recording and maintaining a database of the correlated pitch type data and measured ball flight parameters for the individual pitches, facilitating subsequent analysis and retrieval.

The earlier stated needs are also met by embodiments of a method of tagging pitches comprising wirelessly transmitting intended pitch types to a pitcher for a series of pitches and recording the wirelessly transmitted intended pitch types. Ball flight parameters are measured for a series of pitches and the measured ball flight parameters are recorded for the series of pitches. The intended pitch type for individual pitches is associated with the measured ball flight parameters for respective individual pitches in the series of pitches. A list of individual pitches having respective measured ball flight parameters and associated intended pitch types are output.

An example ball flight management according to the disclosure includes a receiver configured to receive a wireless signal comprising an indication of an intended pitch type for a pitched ball, the intended pitch type being selected from among a plurality of intended pitch types; one or more sensors configured to measure one or more ball flight parameters of a pitched ball and output one or more measured ball flight parameters; and a recording unit in communication with the one or more sensors and the receiver, the recording unit receiving and storing the one or more measured ball flight parameters output by the one or more sensors and the indication of the intended pitch type received by the receiver, the recording unit associating the intended pitch type with the one or more measured ball flight parameters to generate a record for the pitched ball that includes the one or more measured ball flight parameters and the intended pitch type, and the recording unit storing the record in a memory associated with the ball flight management system.

Another example ball flight management system according to the disclosure includes one or more sensors configured to measure one or more ball flight parameters associated with each pitch for a series of pitches and to output one or more measured ball flight parameters for each pitch; and a recording unit in communication with the one or more sensors and an external receiver, the recording unit receiving wireless signal information associated with the series of pitches from the external receiver, the wireless signal information comprising an indication of an intended pitch type selected from among a plurality of intended pitches for each pitch of the series of pitches, wherein the recording unit is further configured to: generate a record for each pitch by associating the one or more measured ball flight parameters associated with the pitch and the intended pitch type associated with the pitch, and store the record in a memory associated with the ball flight management system.

An example method of tagging pitch data in a data processing system according to the disclosure includes obtaining intended pitch type data comprising an indication of an intended pitch type selected from among a plurality of intended pitch types for a series of pitches, wherein each pitch of the series of pitches is associated with a first time stamp; measuring ball flight parameters for the series of pitches to generate measured ball flight parameters; recording the measured ball flight parameters and a second time stamp for each pitch of the series of pitches, the second time stamp representing a time when the measured ball flight parameters for each pitch were measured; correlating the measured ball flight parameters and the intended pitch type data based on the first time stamp associated with each pitch and the second time stamp associated with each measured ball flight parameters for each pitch of the series of pitches to generate a record for each pitch that comprises an intended pitch type for the pitch and the measured ball flight parameters for the pitch; and storing the record for each pitch of the series of pitches in a persistent memory of the data processing system.

An example pitch tagging system according to the disclosure includes a receiver configured to receive a wireless signal comprising an indication of an intended pitch type for a pitched ball, the intended pitch type being selected from among a plurality of intended pitch types; a memory storing one or more measured ball flight parameters output by a ball flight management system, the ball flight management system comprising one or more sensors configured to measure the one or more ball flight parameters and generate the one or more measured ball flight parameters; a recording unit in communication with the one or more sensors and the memory, the recording unit receiving and storing the indication of the intended pitch type received by the receiver, the recording unit associating the intended pitch type with the one or more measured ball flight parameter to generate a record for the pitched ball that includes the one or more measured ball flight parameter and the intended pitch type, and the recording unit storing the record in a memory associated with the ball flight management system.

An example pitch tagging system according to the disclosure includes an intended pitch type communication system including: a transmitter configured to wirelessly transmit a intended pitch type selectable from among a plurality of intended pitch types, and a pitcher receiver configured to wirelessly receive the intended pitch type and signal a pitcher with the intended pitch type; a measuring device having at least one sensor configured to measure at least one ball flight parameter of a pitched ball and output a measured ball flight parameter; and a recording device in communication with the measuring device and the transmitter, the recording device receiving and storing the measured ball flight parameter output by the measuring device and the intended pitch type wirelessly transmitted by the transmitter, the recording device associating the intended pitch type with the at least one measured ball flight parameter to generate a record for the pitched ball that includes the at least one measured ball flight parameter and the intended pitch type; and the measurement device storing the record in a memory associated with the recording device.

An example pitch tagging system to tag a recorded series of measured ball flight parameters measured by a ball flight measuring system, the system comprising: an intended pitch type system, including: a transmitter configured to wirelessly transmit an intended pitch type to a pitcher, and a pitcher receiver configured to wirelessly receive the intended pitch type and signal the pitcher with the intended pitch type; a pitch type recording device that records the intended pitch type for a series of pitches and outputs a recorded series of intended pitch types for the series of pitches; a correlator configured to: compare the output recorded series of intended pitch types for the series of pitches with a recorded series of measured ball flight parameters for the series of pitches; and associate the intended pitch types in the recorded series of pitches with the recorded series of measured ball flight parameters for the series of pitches and associate the intended pitch types in the recorded series of measured ball flight parameter for the series of pitches such that for individual pitches thrown within the series of pitches the intended pitch type and measured ball flight parameters are associated; and an output device that receives and outputs the series of pitches with individual pitches having respective associated intended pitch types and measured ball flight parameters for those individual pitches.

An example method of tagging pitches according to the disclosure includes receiving wirelessly transmitting intended pitch types transmitted by a wireless transmitter to a pitcher for a series of pitches; recording the wirelessly transmitted intended pitch types; measuring ball flight parameters for a series of pitches and recording the measured ball flight parameters for the series of pitches; associating the intended pitch type for individual pitches with the measured ball flight parameters for respective individual pitches in the series of pitches; and outputting a list of individual pitches having respective measured ball flight parameters and associated intended pitch types.

An example system according to the disclosure for associating intended pitch types with ball flight parameters measured by a ball flight tracking system equipped with sensors configured to measure ball flight parameters of thrown ball, includes: a wireless transmitter configured to transmit intended pitch type data; a receiver wearable by a pitcher, the receiver compatible to receive the intended pitch type data from the transmitter and signal the intended pitch type data to the pitcher; a processing unit that correlates the intended pitch type data transmitted to the receiver with measured ball flight parameters collected by the ball flight tracking system to characterize individual pitches with a communicated intended pitch type and corresponding measured flight parameters for those individual pitches; and a data storage system capable of recording and maintaining a database of the correlated pitch type data and measured ball flight parameters for the individual pitches, facilitating subsequent analysis and retrieval.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 depicts an exemplary comma-separated values (CSV) file produced by the pitch tagging system according to the embodiment of FIGS. 2A and 2B.

FIG. 5 depicts an exemplary CSV file of intended pitch types produced by a transmitter.

FIG. 6 depicts an exemplary CSV file produced by a ball flight measurement system such as depicted in FIGS. 3A and 3B.

FIG. 7 depicts an exemplary conversion of relative time stamps of the transmitter data to an absolute time stamp in accordance with certain embodiments of the present disclosure.

FIG. 8 depicts an exemplary CSV file that combines the CSV file of FIG. 5 with correlated intended pitch types based on the correlating process of FIG. 7.

FIG. 9 depicts a CSV file after the correlating process of FIG. 8.

DETAILED DESCRIPTION

Figure 1:
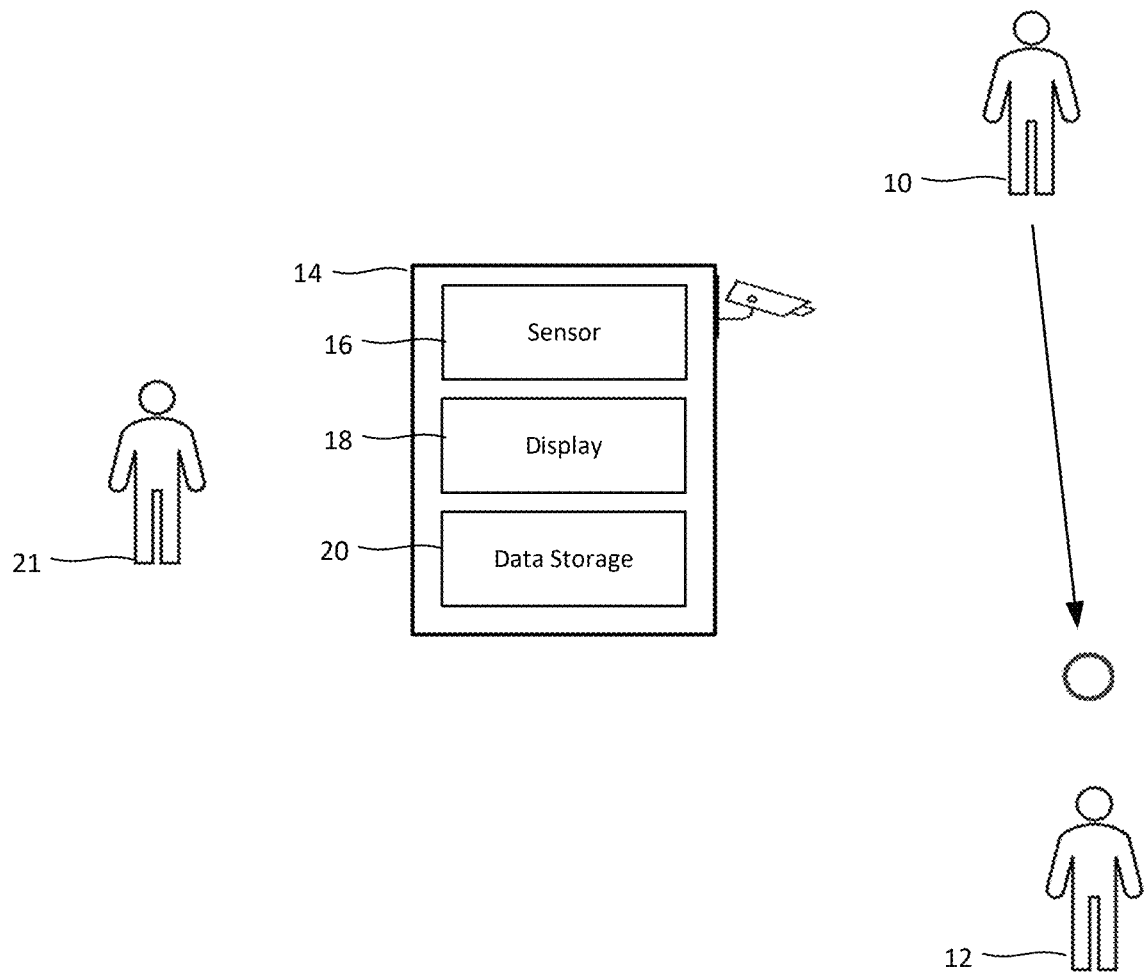
FIG. 1 is a schematic depiction of a ball flight measurement system and pitch tagging process in accordance with the prior art.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, well-known structures and components are shown in block diagram form in order to avoid obscuring the concepts of the subject technology.

The present application provides technical solution to the technical problem of automatically tagging pitches using a ball tracking device. Using tracking devices, it is possible to precisely measure many different parameters of a pitch. These measurements help guide baseball coaches, scouts, and front office executives in determining which pitchers to acquire or trade. They can also use these measurements to help a pitcher improve. Some of the parameters include velocity, spin rate, vertical break, horizontal break, and release point.

When a pitch is thrown, the parameters for that pitch are measured and stored automatically by the ball tracking device. What is not stored is what type of pitch was meant to be thrown. These include different types of pitches like four-seam fastball, two-seam fastball, curve ball, slider, sweeper, sinker, changeup, screwball, etc. For teams evaluating players, whether their own or other players to trade for or promote through their minor league system, it is important to know what type of pitch the pitcher was intending to throw and match that up with the measured parameters when that pitch is actually thrown. If the wrong pitch type is associated (or correlated) with the measured parameters of a pitch, the data is invalid, and this can be costly to a player and to a team.

For example, a college pitcher may throw his fastball at 94 mph (a very good velocity for a college pitcher) and a changeup at 89 mph (good for a changeup, but not nearly as good for a fastball). Some of the pitch parameters other than velocity may be the same for these two pitches. Because of the similarity in parameters, an erroneous pitch type (fastball) may be associated with the changeup. This means that when the pitcher was throwing a changeup at 89 mph, it is stored as a fastball at 89 mph. This one erroneously typed pitch will drag that pitcher's average recorded velocity down. In a data-driven sport like baseball, the reduction in reported velocity for the pitcher's average fastball can have a devastating effect on the evaluation of that player and his potential earning power. It can also lead to erroneous judgements on the part of talent evaluators. In short, erroneous tagging can have serious downstream consequences, financially and competitively.

Especially at the college level, the way that pitch types currently are associated with the parameters of a measured pitch (the process being called "pitch tagging") is by a person who is watching a monitor screen as the pitches are thrown and the parameters for that pitch appear on the screen. As said earlier, these can include, but are not limited to, one or more of velocity, spin rate, vertical break, horizontal break, and release point. Based on some combination of these parameters, this pitch tagging person has to decide within seconds what pitch type it was and note it in the measurement system or write it down. Since the pitch tagger cannot see the finger signals of the catcher, nor be able to decode the finger signals even if he could see them, the pitch tagger does not actually know what pitch type was thrown. Accordingly, the pitch tagger can only make an educated guess of the pitch type based on the measured parameters. For example, if the measurement of the velocity was 95 mph, the pitch tagger may tag the pitch as a four-seam fastball when it was actually a two-seam fastball. Alternatively, it might have been a slider that was thrown, but the pitcher did not put enough spin on it, so the pitch was erroneously tagged as a fastball.

Increasing the likelihood of pitch tagging errors is the common use of a pitch tagger who has a low level of knowledge of the subtle differences between pitch types based on the measurements. Often, in college, a student working a part-time job in the athletics department is given quick training and pressed into service as a pitch tagger to tag pitches for a game. Naturally, such a person will make mistakes in pitch tagging.

Since the signals between a catcher and pitcher are kept secret, the actual pitch the pitcher is trying to throw is not known to the pitch tagger, who is often sitting remotely from the playing field, such as in the press box. It is estimated that over 80% of pitches are not tagged correctly.

Techniques for tagging pitches are provided herein that provide a technical solution to the technical problem associated with automatically tagging pitches discussed above. Tagging pitches, as used herein, refers to associating a pitch type with pitch information. The techniques for tagging pitches provided herein can be applied to pitches thrown in bullpens, in practice and during games. The tagging of pitches can be performed in substantially real time as the pitches are thrown or at a later time.

The techniques of the present disclosure convey intended pitch type information to a pitcher. Upon the pitcher throwing a pitch, a measuring device uses sensors to measure precisely ball flight parameters. The intended pitch type information is correlated with ball flight parameters to tag the individual pitches with the measured ball flight parameters. Using intended pitch type information provides assurance in tagging the measured ball flight data that the tagging is correct. Without the intended pitch type information, it would not be possible to be completely accurate in tagging the measured ball flight parameters for pitches.

A technical advantage of the techniques of the present disclosure is that wireless signaling of the pitch type allows the pitch type data to be obtained during actual game play and correlated with the measured ball flight parameters. It would be impracticable or impossible for a catcher or a pitcher to remember intended pitch types. Providing the pitch types to the pitcher must also be done covertly so as not to tip the pitch type and give the batter an advantage. Another technical advantage of the techniques herein is that the pitch type is conveyed covertly via a wireless signal to avoid providing the batter with such an advantage.

FIG. 1 is a schematic depiction of a ball flight measurement system and pitch tagging process in accordance with the prior art. A pitcher 10 receives signals provided by a catcher 12 or a coach (not shown) to indicate which pitch type to throw. It is important that the catcher and pitcher agree on the pitch type that the pitcher will throw. Otherwise, it will be difficult for the catcher to catch a pitch if he is not expecting the type of pitch that is actually thrown, a situation that is termed a "cross-up". These catcher signals, until recently, were given using hand signals, such as the number of fingers put down between the catcher's legs. Such signaling, however, has always been subject to sign stealing, since at least the 1890's. An observer in the stands, sometimes using binoculars, and more recently television cameras, would observe the signs and inform the batter what pitch to expect. To prevent easy understanding of the signs, almost all teams used a complicated series of signs to obscure which sign was actually the one the pitcher was the "hot sign", the sign that actually indicated the intended pitch type. For example, a catcher or coach could flash a series of four signs, and the sign after the number 2 sign is put down is the hot sign. In a sequence of 1, 2, 4, 1, then, the hot sign is the number 4, indicating that pitch type number 4 is the intended pitch type.

In FIG. 1, a ball flight measurement system 14 is schematically depicted. The ball flight measurement system 14 includes a sensor 16, a display 18, and data store 20. Such systems are well-known and commercially available, from companies such as Yakkertech, Trackman, Hawkeye, Rapsodo, Pocket Radar, etc. The sensor 16 of the ball flight measurement system 14 senses and measures the ball flight parameters. The most common sensing is done either optically (Yakkertech, Hawkeye) or through radar (Trackman, Rapsodo, Pocket Radar). The measured ball flight parameters can be shown immediately after the pitch with most systems on a display 18 and can be output or stored in a storage medium, such as the data storage 20. The data storage 20 is a non-volatile memory that can be implemented as internal storage of the ball flight measurement system 14 or as an external storage that is accessible to the ball flight measurement system 14 via a wired or wireless connection. In yet other implementations, the data storage 20 is implemented as a removable memory, such as but not limited to a memory card or removable memory.

The measured ball flight parameters can include, for example, velocity ("velo"), spin rate ("spin"), vertical break ("vbreak") and horizontal break ("hbreak"). Other measurements can also be made. During a game, a person who is assigned as a pitch tagger 21, will view the measured parameters and physically observe the thrown pitch and determine the pitch type for that thrown pitch. For example, fastballs have less side spin and horizontal and vertical break than a curve ball. Looking at the numbers on the display, the pitch tagger 21 will make a best guess as to the pitch type and enter it into the system 14. The pitch, represented by the measured ball flight parameters, is thereby "tagged" with the pitch type.

The problem with such an arrangement and method is the inaccuracy of the determination of the pitch type due to a number of factors. The pitch tagger 21 cannot see the sequence of finger signals provided by the catcher 12 or other signals by a coach and therefore has no definitive knowledge of the intended pitch type. Even if the pitch tagger 21 could observe the signal sequence through a camera or other means, he would not be able to decode the sequence. Teams often change the sequence during a game and sometimes even during a single at-bat if they suspect the other team is stealing their signs. The pitch tagger 21 would not be aware of such changes.

Another problem with this arrangement is that there is an art to interpreting the measured ball flight parameters to determine what pitch was thrown. The ranges for certain parameters overlap for different pitches. A curveball's parameters overlap with those for a slider, which overlap with a sweeper, etc. And they can also be different for different pitchers. One pitcher's curveball may be another pitcher's slider. Unless the pitch tagger 21 is very experienced with interpreting the measured ball flight parameters, a substantial number of pitches can be erroneously tagged. This issue is exacerbated for college games by the typical use of an inexperienced student or other person to do the pitch tagging with a minimum amount of training.

Figure 2A:
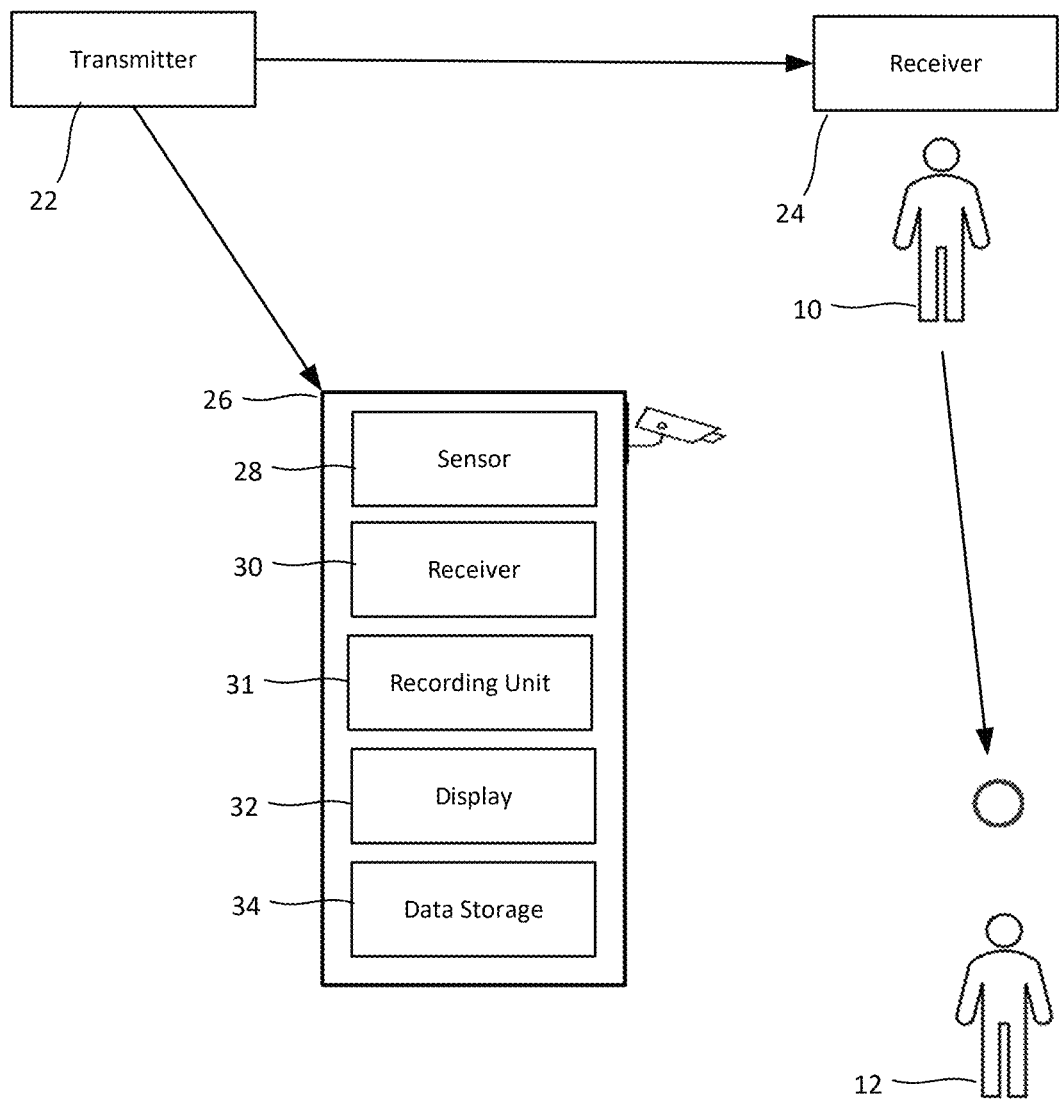
FIG. 2A is a schematic depiction of an example pitch tagging system in accordance with certain embodiments of the present disclosure.

FIG. 2A is a schematic depiction of an example implementation of a pitch tagging system in accordance with certain embodiments of the present disclosure. The pitch tagging provides a technical solution to the technical problems associated with current approaches for pitch tagging. The pitch tagging system provides a technical solution to the technical problems associated with current pitch tagging techniques. The pitch tagging system provides a more accurate determination of pitch type by avoiding the need to manually interpret ambiguous measured ball flight parameters. A technical benefit of the pitch tagging system described herein is that the pitch tagging system more accurately tags pitches with pitch type information than current techniques.

The pitch tagging system shown in FIG. 2A includes a wireless transmitter 22 and a pitcher receiver 24 that is compatible to receive wireless signals from the transmitter 22. These wireless signals, when received by the pitcher receiver 24, signal to the pitcher any number of different types of instructions, such as pitch type, pitch location, defensive alignments, encouragement, etc. Such systems have been introduced in recent years, especially in the wake of notorious sign stealing scandals. The most well-known of these systems is PitchCom®, adopted by Major League Baseball for the 2022 season and beyond. Other systems include those sold by companies Armilla Technologies, GoRout, GameDay Signals. They can use a direct wireless RF connection, like PitchCom®, Armilla Technologies and GameDay Signals, or another medium like a cellular network (GoRout) or WiFi, for example. The PitchCom® system is unique in that the pitcher can be informed audibly of the intended pitch type, although PitchCom® also provides wrist displays that show the intended pitch type to those who would rather see than hear the intended pitch type. The other mentioned companies provide only wrist displays.

The transmitter 22 can be operated by a player on the field, such as a catcher (not shown) or a coach (not shown). In some embodiments, the transmitter 22 is a push button transmitter that includes one or more buttons, which when pressed, cause the transmitter 22 to transmit an indication of an intended pitch type. In the PitchCom® system, for example, in response to a pitch selection at the transmitter 22, a code is wirelessly transmitted to the pitcher receiver 24. This code is interpreted by the pitcher receiver 24 and an intended pitch type is signaled to the pitcher 10. In the PitchCom® system, this signaling to the pitcher 10 can be either audio pronouncement of the intended pitch type ("fastball") or a visual display if using a wrist display. In the other aforementioned systems, this signaling is through a wrist display.

In addition to the pitcher receiver 24 of the pitcher 10 receiving the intended pitch type, a ball flight measurement system 26 receives the intended pitch type transmitted by the transmitter 22 at a receiver 30. The ball flight measurement system 26 also includes a sensor 28, display 32, and data storage 34. The ball flight measurement system 26 implements a recording unit 31 that records measured ball flight parameters for pitches and the associated tag indicating the intended pitch type for these pitches. The recording unit 31 stores the measured ball flight parameters and the associated tag in the data storage 34. The data storage 34 is a machine-readable storage medium that includes non-volatile memory that can be implemented as internal storage of the ball flight measurement system 26 or as an external storage that is accessible to the ball flight measurement system 26 via a wired or wireless connection. In yet other implementations, the data storage 34 is implemented as removable storage, such as but not limited to a memory card or removable memory.

Upon a pitch being thrown by the pitcher 10 after receiving the intended pitch type at the pitcher receiver 24, the sensor 28 senses the flight of the pitch and generates ball flight measurement parameters. The sensor 28 can comprise one or more radar and/or optical sensors. The ball flight measurement parameters can include measurements for various ball flight parameters, such as velocity, spin rate, vertical break, and/or horizontal break. The ball flight measurement parameters can also include additional measured parameters. The ball flight measurement parameters are displayed on the display 32 for that pitch in some implementations. The last intended pitch type sent to the pitcher receiver 24 and received also by the receiver 30 before the pitch is sensed is associated with the measured ball flight parameters for that pitch to "tag" the pitch. Note that it is important to use the last transmitted intended pitch type as the pitch type to associate (tag) the pitch. Often, pitchers will shake off the proposed intended pitch type sent by a catcher or coach and want to throw a different pitch. The catcher or coach will re-transmit a different intended pitch type in that case, potentially doing this multiple times until a pitch type is agreed upon. Once the intended pitch type is agreed upon, the pitcher throws the pitch, and the last intended pitch type will represent the actual intended pitch type and is therefore the correct tag for the pitch with the measured ball flight parameters.

The display 32 can display the tag with the measured ball flight parameters for the pitch. Also, the measured ball flight parameters and the associated tag for the pitches can be provided by the ball flight measurement system 26 to another output device, such as the storage medium 34, externally or internally, or both. The output can be in the form of a CSV file, such as that shown in FIG. 4. CSV files are a text file format for storing tabular data in plain text. Each line of the CSV file typically represents one data record, and the values of each field of the record are separated using commas. This CSV file is exemplary only and can include many more or less data points and data types. In this example, each sensed pitch has data showing the time the pitch was thrown, the pitcher ID, the tagged pitch type, and measured ball flight parameters such as velo, spin, v break, h break. This CSV file can be stored locally or externally and can be shared. The CSV file can also be used to provide data analysis.

Figure 2B:
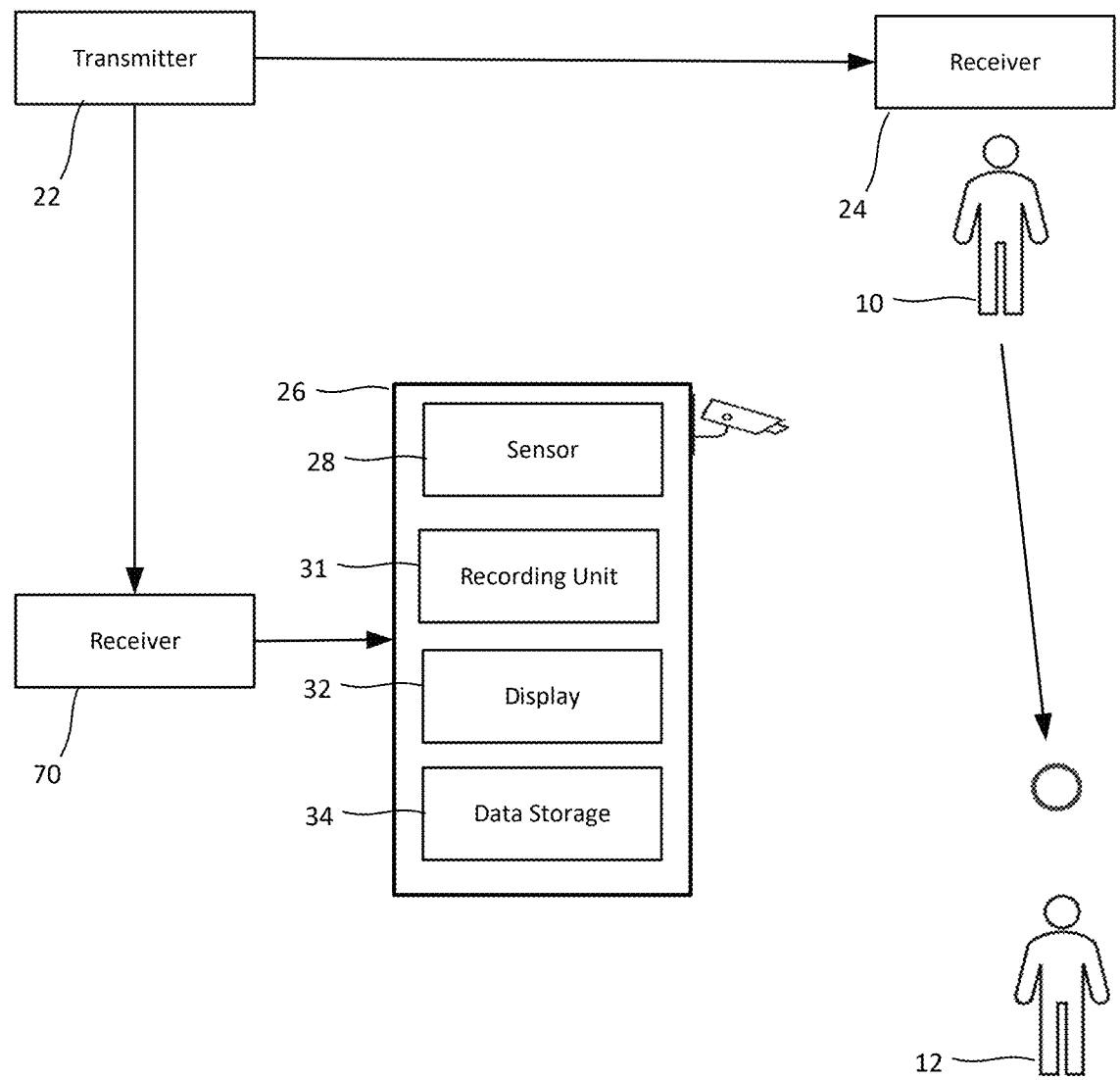
FIG. 2B is a schematic depiction of another example pitch tagging system in accordance with certain embodiments of the present disclosure.

FIG. 2B is a schematic depiction of another example implementation of a pitch tagging system in accordance with certain embodiments of the present disclosure. The example implementation shown in FIG. 2B is similar to the implementation shown in FIG. 2A, except the ball flight measurement system 26 does not include the receiver 30 as shown in FIG. 2A. Instead, the ball flight measurement system 26 is in communication with an external receiver 70. The external receiver 70 receives directly from the transmitter 22 the wireless signals transmitted by the transmitter 22 and outputs the intended pitch type transmitted by the transmitter to the recording unit 31 of the ball flight management system 26. The recording unit 31 processes the measured ball flight parameters and the intended pitch type information in a similar manner as that discussed above with respect to the implementation shown in FIG. 2A.

The technical advantage of the pitch tagging system of FIGS. 2A, 2B, 3A, and 3B is that they provide real time tagging of pitches as they are being thrown and ball flight measurements are being taken. Therefore, the accuracy of the tagging is perfect since a human pitch tagger does not have to determine the pitch types based on measured parameters and make a judgment call. It should be noted that a pitch tagger cannot be provided with a receiver similar to the pitcher receiver to receive the pitches and then manually tag after a pitch since this would be a major security hole. No team wants to expose their signals.

Figure 10:
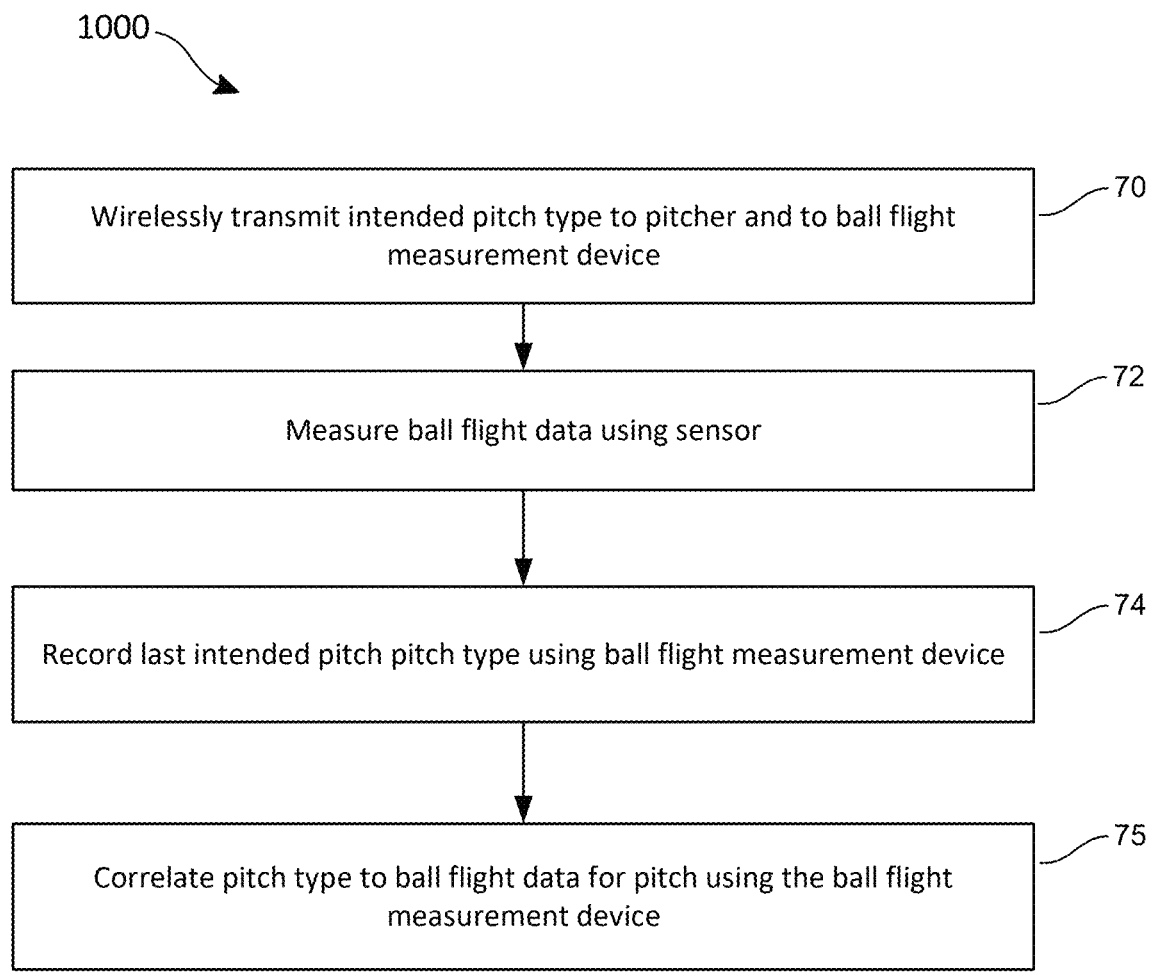
FIG. 10 is a block diagram depicting a method of tagging pitches in accordance with certain embodiments.

The major steps in the above-described process are summarized in FIG. 10. FIG. 10 is a flow diagram of a process 1000 that can be implemented by the pitch tagging systems discussed in the preceding examples. The process 1000 includes an operation 70 in which one or more intended pitch types are transmitted to a pitcher and to a ball flight measurement device, such as the ball flight measurement device 26. The one or more intended pitch types are transmitted by the transmitter 22, and the ball flight measurement device 26 stores the one or more intended pitch types. The process 1000 includes an operation 72 in which the sensor 28 of the ball flight measurement device 26 measures ball flight data in response to the pitcher throwing a pitch and outputs one or more measured ball flight parameters. The process 1000 includes an operation 74 in which the recording unit 31 of the ball flight measurement device 26 records an indication of the last intended pitch type transmitted by the transmitter 22 prior to the pitcher throwing the pitch. The recording unit 31 stores the indication of the last intended pitch type in the data storage 34. The recording unit 31 also stores the one or more measured ball flight parameters in the data storage 34. In operation 75, the recording unit 31 of the ball flight measurement device 26 correlates the last intended pitch type with the one or more measured ball flight parameters. In other implementations, the correlation operation is performed by a correlator, such as the correlator unit 46 discussed in the examples which follow. Such a correlator is implemented separately from the ball flight measurement device 26. The correlated data is stored in the data storage 34 in some implementation. The correlated data may also be output to an external computing device (not shown) for further processing and/or a database or other external storage medium, including but not limited to cloud-based storage. The correlated data can be output in a CSV file or other data format. The techniques disclosed herein are not limited to a specific data format.

Figure 3A:
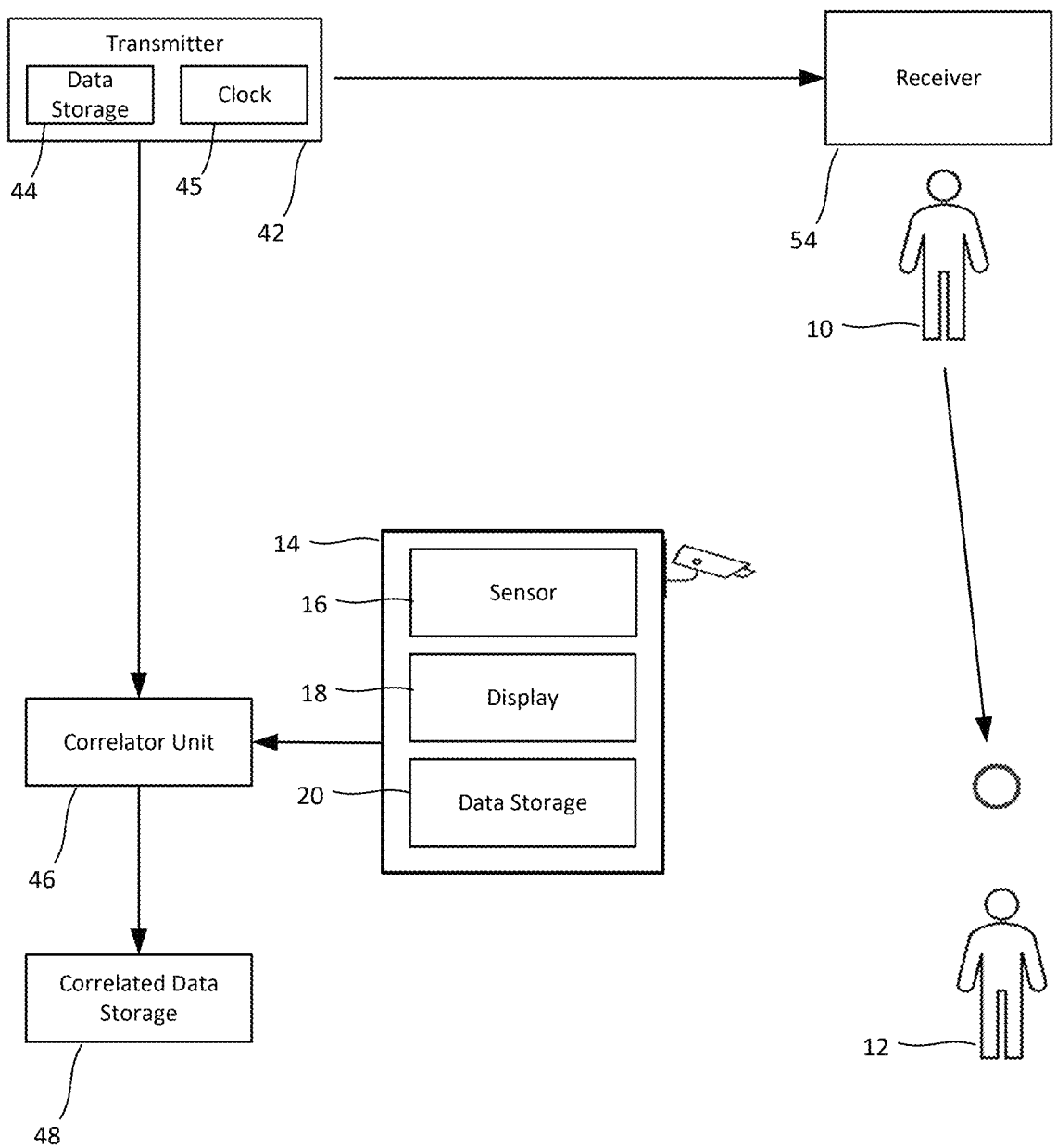
FIG. 3A is a schematic depiction of another pitch tagging system that tags pitches with ball flight parameters that are measured by a separate ball flight measurement system.

FIG. 3A depicts a pitch tagging system in accordance with other embodiments of the present disclosure. As in the embodiment of FIGS. 2A and 2B, a wireless signal calling system is employed. The signal calling system in this embodiment includes a wireless transmitter 42 and a pitcher receiver 54. The wireless transmitter 42 is implemented similarly to the wireless transmitter 22 discussed in the preceding examples, and the pitcher receiver 54 is implemented similarly to the pitcher receiver 24 discussed in the preceding examples.

In the example embodiment shown in FIG. 3A, the transmitter 42 includes local storage 44 that stores information for transmissions output by the wireless transmitter 42. As discussed in the preceding examples, these transmissions can include various instructions to the pitcher, such as but not limited to an intended pitch type, pitch location, defensive alignments, encouragement, etc. The local storage 44 is implemented as a persistent storage in a memory of the wireless transmitter 42 that is used to store information associated with each of the transmissions by the wireless transmitter 42. The information associated with these transmissions can be periodically deleted from the local storage 44 once the data has been downloaded for processing by the correlator unit 46. The transmitter 42 includes a control that, which activated by a user, deletes all or a portion of the information associated with the transmissions that was stored in the local storage 44.

Figure 3B:
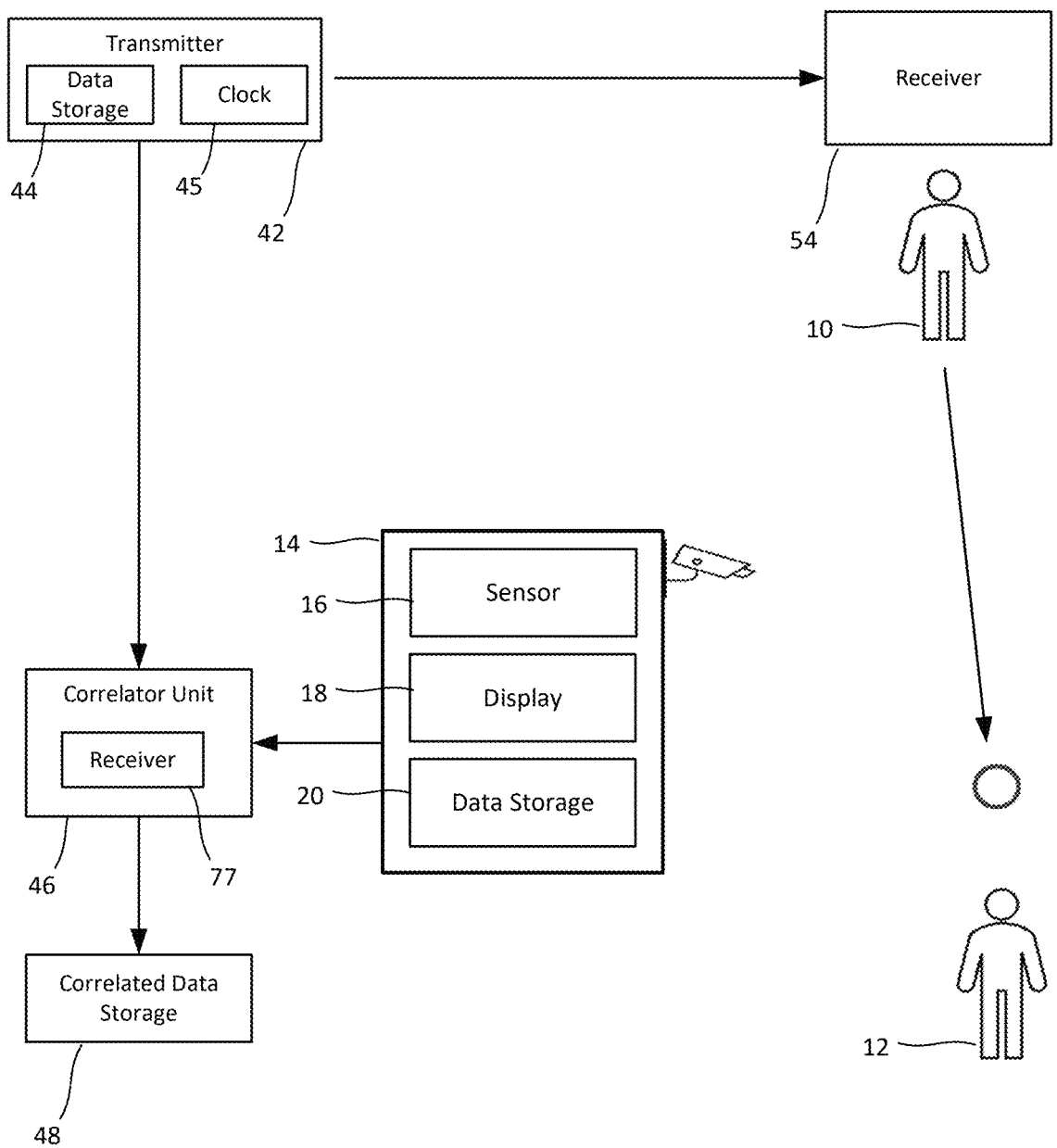
FIG. 3B is a schematic depiction of another pitch tagging system that tags pitches with ball flight parameters that are measured by a separate ball flight measurement system similar to that shown in FIG. 3A but also includes a receiver.

An onboard clock 45 records the time of these transmissions. The time can be an absolute time (i.e., time of day) or a relative time that measures the time elapsed since an initiation of the pitching session. As shown in FIG. 3B, another receiver 77 is utilized that is separate from the ball flight measuring system 14 in some embodiments. The receiver 77 receives, stores, and time stamps the transmissions in such implementations.

The ball flight measurement system 14 can be the same type as employed in the prior art arrangements. It includes sensor 16, display 18, and data storage 20. The pitch tagging system in accordance with embodiments of the present disclosure includes a correlator unit 46 that associates or correlates intended pitch types with the ball flight measurement data for pitches thrown and sensed by the ball flight measuring system 14. Additional details of the correlation performed by the correlator unit 46 are discussed in the example implementations which follow. The pitch tagging system also includes data storage 48 that stores the correlated data output by the correlator unit 46. The data storage 48 can also be used to store the intended pitch type information and the measured ball flight parameters used by the correlator unit 46 to generate the correlated data. The data storage 48 is a persistent data storage. The data storage 48 can be implemented by a database and can be implemented using cloud-based storage that is accessible over a network.

The correlator unit 46 receives the ball flight measurement data from storage 20 of the ball flight measurement system, and the intended pitch type data from local storage 44 of the transmitter 42. This receiving of the data by correlator unit 46 from storage 20 and local storage 44 can be done right after the pitch is thrown or can be done anytime afterward. In a non-limiting example, the data correlator unit 46 can receive the intended pitch type data and the ball flight measurement data in substantially real time after the pitch is thrown. In another non-limiting example, the correlator unit 46 receives the data minutes, hours, days, weeks, or even months after the pitches are thrown. Some implementations of the correlator unit 46 include a control that enable the user to configure the correlator unit 46 to obtain the data in substantially real time and/or to obtain the data from the storage 20 of the ball flight measuring system 14 and/or the storage 44 of the wireless transmitter 42 at a later time in response to the user input. The functionality of the correlator unit 46 described herein can be implemented by the recording unit 31 of the ball flight measurement device 26 in other implementations.

Stored intended pitch type data can be formatted as a CSV file, although other storage formats are possible. An example is depicted in FIG. 5. In this example, one column represents a relative time since the start of the game or pitching session. The start of the game or session is time 00:00:00:00. Each transmission of an intended pitch is time stamped and the intended pitch type is noted. The CSV file can have a time interval between received pitch type signals ("events"). In certain embodiments, the CSV file does not have a time interval stored.

Figure 3C:
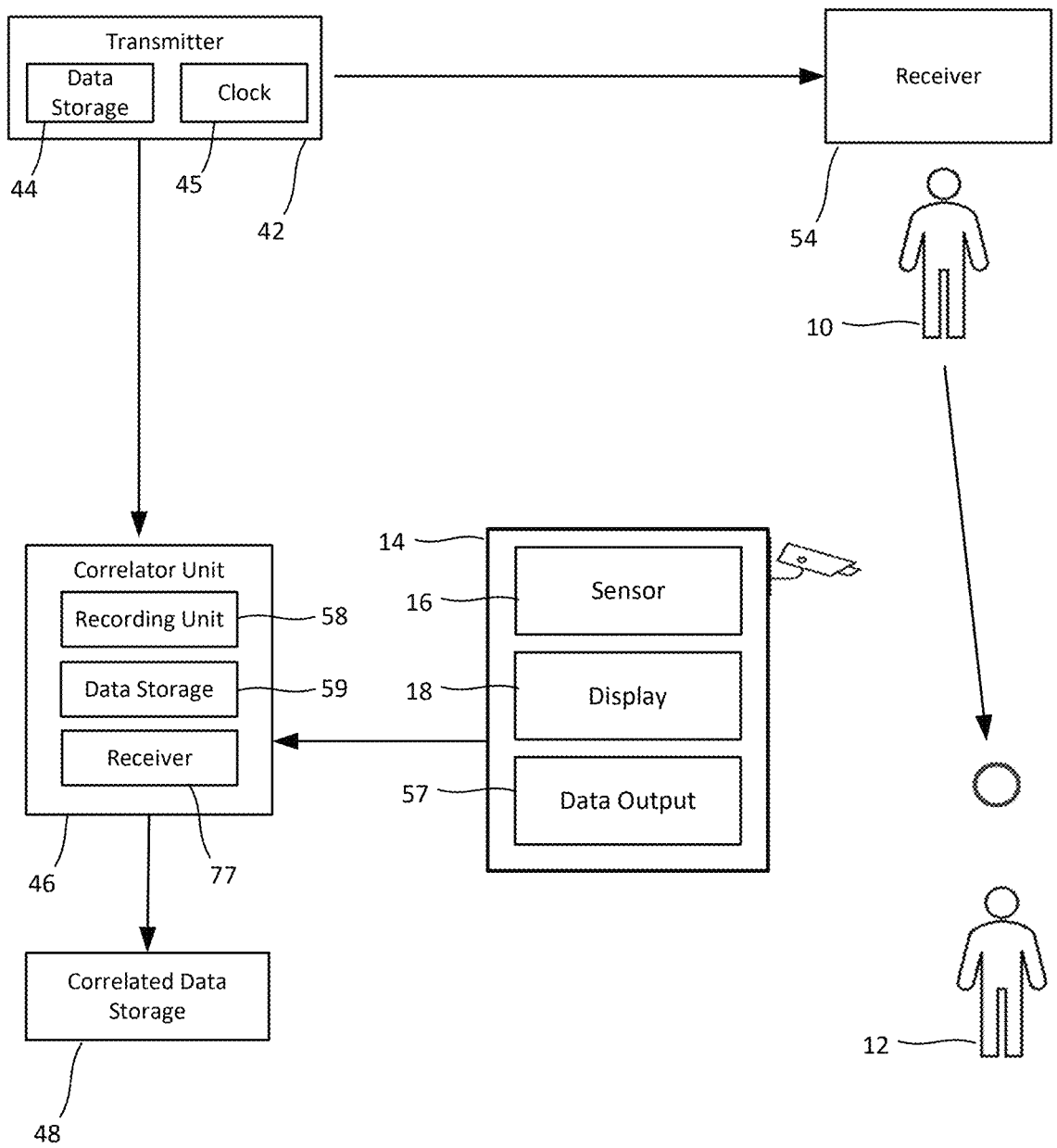
FIG. 3C is a schematic depiction of another pitch tagging system that tags pitches with ball flight parameters that are measured by a separate ball flight measurement system similar to that shown in FIG. 3A but also includes a receiver and recording unit.

FIG. 3C shows another example embodiment of the correlator unit 46 that includes a receiver 77, a recording unit 58, and data storage 59. In this example embodiment, the ball flight measurement system 14 includes a data output 57 instead of the data storage 20 shown in the preceding example embodiments. In such implementations, the data output 57 of the ball flight measurement system 14 outputs the time stamped measured ball flight parameters generated by the sensor 16 via a wireless or wired connection to the correlator unit 77. In other implementations, the data output 57 outputs the time stamped measured ball flight parameters to a server or cloud-based storage system (not shown) that stores the time stamped measured ball flight parameters. In such implementations, the correlator unit 46 obtains the stored data from the server or cloud-based storage system via a wired or wireless network connection. The correlator unit 46 may also include a display and controls that enable a user to configure the correlator unit 46 to obtain the time stamped measured ball flight parameters from the server or cloud-based storage. The correlator 46 also implements the recording unit 58 and the data storage 59 in such implementations. The recording unit 58 operates similarly to the recording unit 31 discussed in the preceding examples and stores last intended pitch type information transmitted by the transmitter 42 in the data storage 59. The recording unit 58 also stores the time stamped measured ball flight parameters from the server or cloud-based storage in the data storage 59. The recording unit 58 then correlates the last intended pitch type with the one or more measured ball flight parameters as discussed in the preceding example embodiments and outputs the correlated data to the correlated data storage 48.

FIG. 6 depicts an exemplary set of stored ball flight measurement data for a series of thrown pitches. Each pitch has an associated time stamp, which can be absolute time (derived from the internet, for example) or relative time from an initial event, such as the first pitch thrown. Most ball flight measurement systems have absolute time stamps so the following description of the correlation process will assume that to be the case. The stored ball flight measurement data can be formatted as a CSV file although other formats are possible. Each pitch has ball flight measurements, but unlike the embodiment of a CSV file shown in FIG. 4 (for the system of FIGS. 2A and 2B), there is no pitch type in this CSV file.

The correlator unit 46 adjusts the time stamps of the intended pitches. In certain embodiments, the first pitch type that is actually thrown is determined by finding the first significant time interval after a pitch signal has been sent. The first significant time interval is determined by identifying a time interval that exceeds a time interval threshold. This time interval threshold is predetermined in some implementations of the correlator unit 46. The interval threshold is configurable in some implementations, and the correlator unit 46 provides an interface that enables a user to configure the time interval threshold. The time interval threshold can be selected based on an estimate of how long it would take a catcher to call another pitch after a pitch has been signaled. In a non-limiting example, at time t=0 the catcher calls a pitch. At time t+5 (5 seconds have elapsed since t=0) the pitcher receives has received the signal from the catcher, agreed to the signal, and thrown the pitch. The catcher then has to throw the ball back to the pitcher and call the next pitch at t+10 (ten seconds have elapsed since t=0 when the catcher initially called previous pitch). Thus, in this example embodiment, the time interval threshold is set to 10 seconds. However, implementations of the correlator unit 46 are not limited to a 10 second time interval threshold, and different values for the time interval threshold can be utilized that are suitable for a particular implementation.

In the example of FIG. 5, the first significant time interval is from Event 3 to Event 4 (12:17 seconds). The example of FIG. 5 utilizes the time interval threshold of 10 seconds from the non-limiting example above, which indicates that a pitch was most likely actually thrown between Events 3 and 4. According to embodiments of the present disclosure, that means that the pitch type for the pitch thrown between Events 3 and 4 in FIG. 5 was the pitch type of Event 3. That is because it is the last pitch type signaled to the pitcher before the pitch. In this case, the pitch type at Event 3 is a fastball.

The correlator unit 46 now adjusts the time stamps of the intended pitch type transmissions, as seen in FIG. 7. The first event that was determined to have been actually thrown by the pitcher was at intended pitch type Event 3. The first ball flight measured pitch was measured at 18:07:05:22. In certain embodiments, the relative time of the intended pitch type of Event 3 in FIG. 5 (00:00:05:21) is subtracted from the absolute time of the ball flight measure pitch Event 1 in FIG. 6 (18:07:05:22). The subtraction result is now set as the new time stamp for Event 3 in FIG. 7. The same subtraction is performed on each of the times stamps of FIG. 5 for all of the Events 4-N after Event 3. The resulting intended pitch time stamps are shown in FIG. 7.

The correlator unit 46 can now step through the ball flight measured Events 1-5 of FIG. 6 and compares to the adjusted time stamps of the intended pitch types of FIG. 7. The results are shown in FIG. 8. The correlator associates ("tags" or "correlates") the ball flight measurement data for an Event with the intended pitch type transmission Event that immediately preceded the thrown pitch. In the example of FIGS. 6 and 7, the first thrown pitch (ball flight measurement event) was determined by the time interval between signals and transmitted intended pitch type Event 3 was associated with the first pitch. In this case, intended pitch type of Event 3 was a fastball so that "fastball" is associated with the ball flight measurement data of thrown pitch at Event 1. The ball flight measurement time was 18:07:05:22, and the intended pitch adjusted time was 18:07:00:01.

The next pitch occurred at Event 2 in FIG. 6 at 18:07:20:08. The last intended pitch type event before that was at 18:07:12:18 (Event 4) according to FIG. 7. The intended pitch type of Event 4 is a curveball, so "curveball" is associated with the ball flight measurement data of the pitch thrown at Event 2 in FIG. 6.

The same process occurs for Event 3 of FIG. 6, with the correlator unit 46 associating the intended pitch type "fastball" for that pitch, as indicated in FIG. 7. The next pitch is measured at Event 4 in FIG. 6 at 18:08:10:12. There have been two intended pitch types transmitted between the last thrown pitch and this one; a fastball intended pitch type at 18:07:53:33 (Event 6 in FIG. 7) and a slider intended pitch type at 18:07:56:44 (Event 7 in FIG. 7). The intended pitch type that immediately preceded Event 4 in FIG. 6, i.e., the thrown and measured pitch, was the slider. Therefore, "slider" is associated with the pitch of Event 4 in FIG. 6. The same situation occurs for the last pitch. First, a fastball is transmitted to the pitcher at Event 8 of FIG. 7. Then a curveball is transmitted at Event 9. After that, the pitch is actually thrown and measured at Event 5 of FIG. 6. The last pitch type transmitted before the pitch was thrown was a curveball, so "curveball" is associated with the ball flight measurement data for Event 5 of FIG. 6.

FIG. 9 shows the CSV file after the ball flight measurement data of FIG. 6 has been accurately tagged in accordance with the above disclosed embodiments. This CSV file can be stored locally and externally and can be output to storage or a display or be used in further processing to provide data in a more graphic and usable form.

Figure 11:
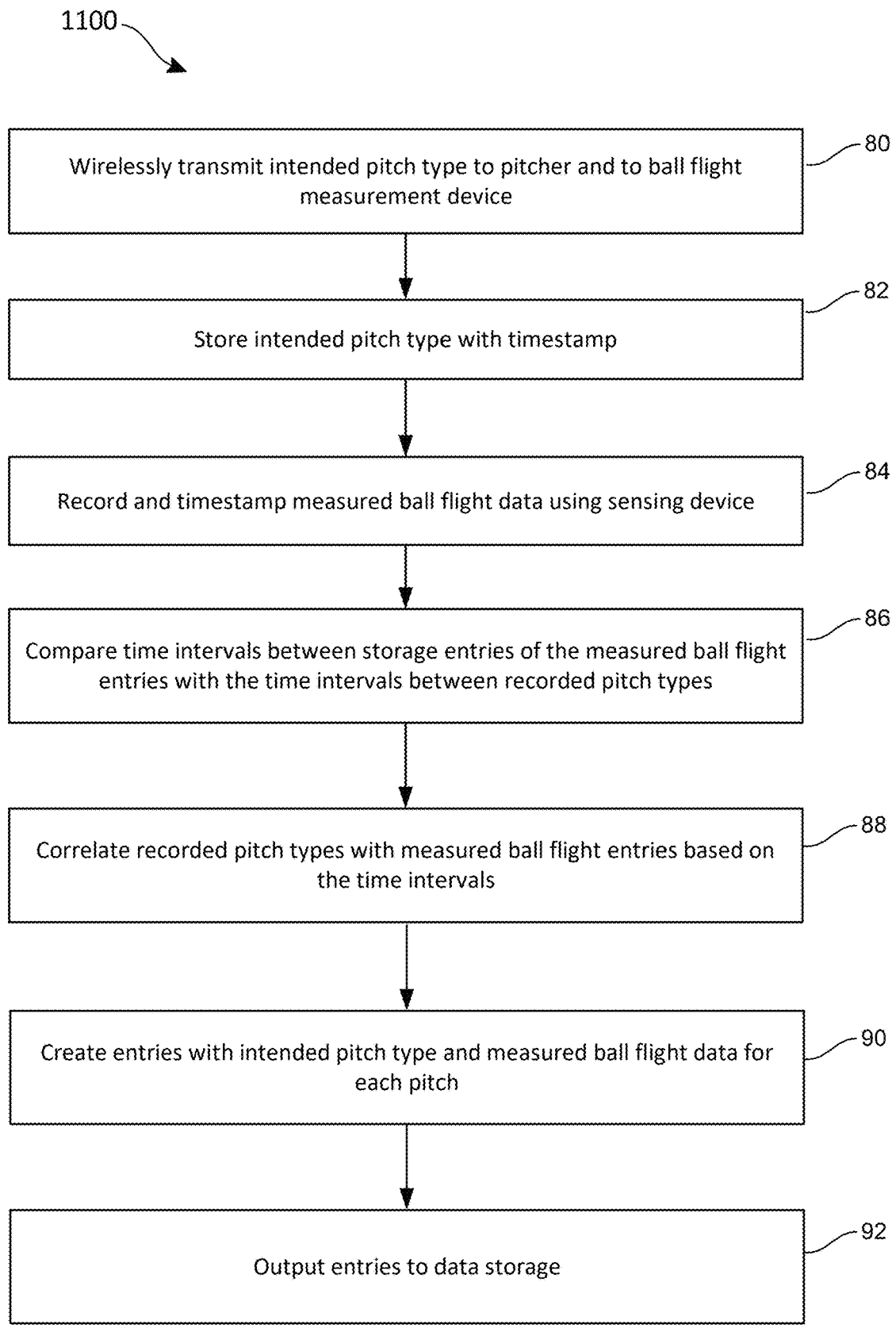
FIG. 11 is a block diagram depicting a method of tagging pitches in accordance with certain other embodiments.

The major steps in the above-described process are summarized in FIG. 11. FIG. 11 is a flow diagram of a process 1100 that can be implemented by the pitch tagging systems discussed in the preceding examples. The process 1100 includes an operation 80 of wirelessly transmitting an indication of an intended pitch type using the transmitter 42 shown in the example implementation of FIG. 3A or 3B. The indication of the intended pitch type is received by the pitcher receiver 54 and the ball flight measurement device 14. The process 1100 includes an operation 82 of storing the intended pitch type indication with a time stamp as discussed in the preceding examples. The transmitter 42 stores the intended pitch type and the time stamp in the data storage 44. As discussed in the preceding examples, the data storage 44 can be implemented as internal storage of the transmitter 42 and/or external storage in communication with the transmitter 42.

The process 1100 includes an operation 82 in which the sensor 16 of the ball flight measurement device 14 measures ball flight data in response to the pitcher throwing a pitch and outputs one or more measured ball flight parameters. In an operation 84, the sensor 16 time stamps the measured ball flight parameters with the time that the pitch was detected so that the correlator unit 46 can correlate the intended pitch information stored in the storage 44 associated with the transmitter 42 with the measured ball flight parameters. The sensor 16 stores the time stamp information and the one or more measured ball flight parameters in the data storage 20 of the ball flight measurement device 14.

The process 1100 includes an operation 86 in which the correlator unit 46 compares the time intervals between recorded intended pitch types, and an operation 88 in which the correlator unit 46 correlates the intended pitch types with the one or more measured ball flight parameters output by the sensor 16 in response to detecting the pitches. The comparing and correlation operations performed by the correlator unit 46 are discussed in the preceding examples. The process 1100 also includes an operation 90 of creating an entry with the intended pitch type and measured ball flight data for each pitch, and an operation 92 of outputting these entries to data storage. The correlator unit 46 can store the correlated data output by the correlator unit 46 in a CSV file or other data format in the data store 48.

With the embodiments of FIGS. 3A and 3B, a pitch tagging can be performed at any time after a pitching session or game by a correlation of the recorded intended pitch type data and the recorded ball flight measurement data. A technical benefit of this approach is that it avoids integrating a receiver into a ball flight measurement system, such as in the embodiments of FIGS. 2A and 2B, and also avoids the inaccuracy of using a human pitch tagger, such as the pitch tagger 21.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure us explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principle defined herein may be applied to other aspects. Thus, the claims are not intended to be limited to the aspects shown herein but are accorded the full scope consistent with the language of the claims, wherein reference to an element in the singular is not intended to mean "one and only one: unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any are used for convenience only and do not limit the subject disclosure.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of tagging pitch data in a data processing system, the method comprising:
   locally storing information to create locally stored information in a wireless transmitter of a wireless baseball signal calling system for intended pitch type signal transmissions output by the wireless transmitter to a pitcher-worn wireless receiver, the intended pitch type signal transmissions informing a pitcher wearing the pitcher-worn wireless receiver which pitch type to throw prior to throwing a pitch, the locally stored information including intended pitch type for a pitch;
   storing ball flight parameters measured by a ball flight measuring system for a pitch to generate measured ball flight parameters;
   obtaining the locally stored information in the wireless transmitter;
   correlating the measured ball flight parameters and the locally stored information in the wireless transmitter to generate a record of a pitch that comprises an intended pitch type for the pitch and the measured ball flight parameters for the pitch by comparing a time that the information was transmitted by the wireless transmitter before a particular pitch to the time that the ball flight parameters for that particular pitch was measured; and
   storing the record for each pitch of a series of pitches in a persistent memory of the data processing system.

2. A method of tagging pitch data in a data processing system, the method comprising:
   transmitting pitch type information from a wireless transmitter of a wireless baseball signal calling system to a pitcher-worn wireless receiver and providing the pitch type information to a correlator unit, the pitch type information informing a pitcher wearing the pitcher-worn wireless receiver which pitch type to throw prior to throwing a pitch;
   receiving and storing, at the correlator unit, measured ball flight parameters measured by a ball flight measuring system for a pitch;
   correlating with the correlator unit the measured ball flight parameters and the pitch type information to generate a record of a pitch that comprises an intended pitch type for the pitch and the measured ball flight parameters for the pitch by comparing a time that the pitch type information was transmitted to the pitcher-worn wireless receiver before a particular pitch and a time that the measured ball flight parameters for that particular pitch was measured; and
   storing the record for each pitch of a series of pitches in a persistent memory of the data processing system.

3. A method of tagging baseball pitch data in a data processing system, the method comprising:
   receiving intended pitch type data for a pitch corresponding to an intended pitch signal sent by a wireless transmitter of a wireless baseball signal calling system to a pitcher-worn wireless receiver, the intended pitch type data informing a pitcher wearing the pitcher-worn wireless receiver which pitch type to throw prior to throwing the pitch;
   receiving at least one measured ball flight parameter for the pitch;
   correlating the at least one measured ball flight parameter and the intended pitch type data for the pitch to create correlated data wherein receiving the intended pitch type data for a pitch includes storing the intended pitch type data in the wireless transmitter during a game and sending the intended pitch type data to a correlator after the game to correlate the at least one measured ball flight parameter and the intended pitch type data; and
   storing a record of the correlated data in a persistent memory of the data processing system.

4. The method of claim 3, wherein receiving the at least one measured ball flight parameter for the pitch includes receiving the at least one measured ball flight parameter at the correlator after the game.

5. The method of claim 3, wherein the correlator receives the at least one measured ball flight parameter during a game and wherein the wireless transmitter stores the intended pitch type data for the pitch locally during the game and the correlator receives the intended pitch type data from the wireless transmitter after the game.

6. A method of tagging baseball pitch data in a data processing system, the method comprising:

receiving intended pitch type data for a pitch corresponding to an intended pitch signal sent by a wireless transmitter of a wireless baseball signal calling system to a pitcher-worn wireless receiver, the intended pitch type data informing a pitcher wearing the pitcher-worn wireless receiver which pitch type to throw prior to throwing the pitch, wherein receiving the intended pitch type data for a pitch includes storing the intended pitch type data in the wireless transmitter during a game and sending the intended pitch type data to a correlator after the game;

receiving at least one measured ball flight parameter for the pitch wherein receiving the at least one measured ball flight parameter for the pitch includes receiving the at least one measured ball flight parameter at the correlator after the game;

correlating the at least one measured ball flight parameter and the intended pitch type data for the pitch to create correlated data, wherein correlating is performed after the game; and storing a record of the correlated data in a persistent memory of the data processing system.

7. The method of claim 6, wherein the intended pitch type data has a first time associated with when the intended pitch signal for the pitch was sent by the wireless transmitter to the pitcher-worn wireless receiver, and the at least one measured ball flight parameter has a second time associated with when the pitch was thrown, and correlating includes comparing the first time with the second time to correlate the intended pitch type data for the pitch with the at least one measured ball flight parameter for the pitch.

8. The method of claim 7, wherein comparing the first time with the second time includes determining a last intended pitch type data sent by the wireless transmitter immediately prior to the pitch.

9. The method of claim 8, further comprising measuring the at least one measured ball flight parameter for the pitch and providing the at least one measured ball flight parameter to the correlator.

10. The method of claim 8, wherein the wireless baseball signal calling system sends the intended pitch signal to the pitcher-worn wireless receiver over a network.

11. The method of claim 10, wherein the pitcher-worn wireless receiver is a display receiver.

12. The method of claim 11, wherein the wireless transmitter is a tablet.

13. A method of tagging baseball pitch data in a data processing system, the method comprising:

receiving intended pitch type data for a pitch corresponding to an intended pitch signal sent by a wireless transmitter of a wireless baseball signal calling system to a pitcher-worn wireless receiver, the intended pitch type data informing a pitcher wearing the pitcher-worn wireless receiver which pitch type to throw prior to throwing the pitch;

receiving at least one measured ball flight parameter for the pitch;

correlating the at least one measured ball flight parameter and the intended pitch type data for the pitch to create correlated data, wherein the intended pitch type data and the at least one measured ball flight parameter are received by a correlator during a game and correlating is performed during the game; and storing a record of the correlated data in a persistent memory of the data processing system.

14. The method of claim 13, wherein the wireless baseball signal calling system sends the intended pitch signal to the pitcher-worn wireless receiver over a network.

15. The method of claim 14, wherein the pitcher-worn wireless receiver is a display receiver.

16. The method of claim 15, wherein the wireless transmitter is a tablet.

17. A method of providing a sequence of wirelessly transmitted baseball signals, the method comprising:

wirelessly transmitting a sequence of intended pitch type signals from a wireless transmitter to a pitcher-worn wireless receiver, the sequence of intended pitch type signals informing a pitcher wearing the pitcher-worn wireless receiver which pitch types to throw prior to throwing pitches, the pitcher-worn wireless receiver configured to inform a pitcher of the sequence of intended pitch type signals;

storing the sequence of intended pitch type signals that were wirelessly transmitted in persistent data storage of the wireless transmitter; and outputting the sequence of intended pitch type signals that were wirelessly transmitted in human readable form as a comma separated value (CSV) file.

18. The method of claim 17, wherein wirelessly the sequence of intended pitch type signals are transmitted to a correlator that stores the sequence of intended pitch type signals and correlates measured ball flight parameters with the sequence of intended pitch type signals.

19. The method of claim 17, wherein wirelessly transmitting the sequence of intended pitch type signals from a transmitter to a pitcher-worn wireless receiver includes transmitting the sequence of intended pitch type signals to the pitcher-worn wireless receiver over a network.

20. The method of claim 19, wherein the pitcher-worn wireless receiver is a display receiver.

21. The method of claim 20, wherein the wireless transmitter is a tablet.

* * * * *